United States Patent
Paton et al.

[11] 3,869,592
[45] Mar. 4, 1975

[54] METHOD OF ELECTROSLAG WELDING OR HARDFACING

[76] Inventors: Boris Evgenievich Paton, ulitsa Kotsjubinskogo, 9, kv. 21; Boris Izrailevich Medovar, ulitsa Anri Barbjusa 22/26, kv. 109; Leonid Gustavovich Puzrin, ulitsa Solomenskaya, 16, kv. 58; Avram Shaevich Gorodetsky, ulitsa Krasnoarmeiskaya, 80 kv. 56, all of Kiev; Jury Yakovlevich Ischenko, Pereulok Krasny, 7, Kievskaya Oblast; Igor Stepanovich Pryanishnikov, ulitsa Nikolaeva 23, kv. 49, Moskovskaya Oblast; Vladimir Nikiforovich Zhuchin, ulitsa Pervomaiskaya 48, kv. 43, Moskovskaya Oblast; Valentin Vasilievich Topilin, ulitsa Mira 6, kv. 29, Moskovskaya Oblast; Mikhail Markovich Kljuev, ulitsa Mira 2, kv. 77, Moskovskaya Oblast; Vladimir Sergeevich Laktionov, ulitsa Nikolaeva 23, kv. 5, Moskovskaya Oblast; Jury Grigorievich Grebtsov, ulitsa Gorkogo 5, kv. 5, Moskovskaya Oblast; Igor Vasilievich Perepelitsa, ulitsa Nikolaeva 54, kv. 6, Moskovskaya Oblast; Nina Petrovna Fomicheva, ulitsa Nikolaeva 31, kv. 20, Moskovskaya Oblast; Georgy Alexandrovich Boiko, ulitsa Vladimiro-Lybedskaya, 16, kv. 106, Kiev; Anatoly Antonovich Kirsenko, ulitsa Parkhomenko, 17, Kievskaya Oblast; Dmitry Pavlovich Rozanov, Polyarny proezd, la, kv. 13; Stanislav Vasilievich Karlov, ulitsa Koreshkova, 6, kv. 5, both of Moskovskaya, all of U.S.S.R.

[22] Filed: June 20, 1973

[21] Appl. No.: 371,692

[52] U.S. Cl. ................................. 219/73, 164/52
[51] Int. Cl. .......................................... B23k 25/00
[58] Field of Search ........ 219/73, 126, 137; 148/26; 164/52, 252

[56] References Cited
UNITED STATES PATENTS

| | | | |
|---|---|---|---|
| 2,948,805 | 8/1960 | Berg et al. | 219/137 |
| 3,046,383 | 7/1962 | Cabelka | 219/73 |
| 3,575,567 | 4/1971 | Nishio et al. | 219/73 |
| 3,625,757 | 12/1971 | Wiehe et al. | 219/73 X |
| 3,646,312 | 2/1972 | Cable et al. | 219/73 X |

*Primary Examiner*—J. V. Truhe
*Assistant Examiner*—Clifford C. Shaw
*Attorney, Agent, or Firm*—Holman & Stearn

[57] ABSTRACT

A method of electroslag welding or hardfacing for producing high-quality welded joints or deposited layers is effected with a stationary electrode, whose cross-sectional area is equal to that of deposited metal at a normal temperature, mounted between moulding parts and workpieces being welded or hardfaced with space amounting to the thermal expansion of the electrode when heated to its melting point.

Owing to this welding or hardfacing can be executed on simple equipment, weldments can be produced featuring stable penetration along the entire surface being welded or hardfaced and a homogeneous chemical composition of the weld of hardfacing layer is ensured.

6 Claims, 15 Drawing Figures

METHOD OF ELECTROSLAG WELDING OR HARDFACING

BACKGROUND OF THE INVENTION

The present invention relates to electroslag welding or hardfacing and, more particularly concerns methods of electroslag welding or hardfacing with a stationary electrode. It may prove to be most advantageous for the production of high-quality welded joints and hardfacing layers.

At present the known procedures of electroslag welding or hardfacing are based on the liberation of heat generated when an electric current is passed between an electrode and parent metal through a molten slag pool. In the slag melt, which has a higher (as compared to metal) ohmic resistance, a high temperature is maintained which is required for melting the electrode, preheating and flashing the edges of workpieces being welded or hardfaced. The molten metal of the electrode passes through the slag pool in the form of fine droplets and, upon intermixing with the metal of the flashed edges of the workpieces, runs off into a metal pool which solidifies gradually forming a weld or a hardfacing layer.

The workpieces prior to electroslag welding or hardfacing are mounted with a space therebetween, with consumable electrodes being introduced into the space to produce a weld or hardfacing layer. Usually the cross-sectional area of the electrode is much smaller than that of the deposited metal. The electrodes, preferably wires or plates, are thereby fed into the slag pool with the help of special mechanisms. When heavy workpieces of very large thicknesses are to be connected, either the electrodes are manipulated in a weaving pattern or multielectrode welding is employed. Sometimes the wire electrodes are utilized in conjunction with consumable electrode guides or electrodes mounted stationary between the edges of parent metal. The cross-sectional area of such guides or electrodes is smaller than that of the deposited metal. In this case the electrodes are set up between the workpieces being welded or hardfaced with a space therebetween.

The most favourable conditions for electroslag welding or hardfacing are created with the weld axis arranged vertically. If that is the case, positive moulding is employed for executing a weld or a hardfacing layer; this is effected by cooling artificially a part of the side surface of the metal pool. To this end usually copper water-cooled plates are employed as moulds, with the plates being either fixed along the length of the weld or carried with the aid of special mechanisms along the weld as the latter crystallizes. In this case a slag skin is formed during electroslag welding or hardfacing on the surface of the welded joint or hardfacing layer on the side of the plates being cooled.

Occasionally the weld pool is moulded with the help of permanent back-up plates which fuse with the weld or hardfacing layer. The slag skin is not formed in this case.

As a rule, equipment for electroslag welding or hardfacing is fitted with mechanisms ensuring the feed of electrodes into the slag pool, electrode weaving and the transfer of the welding outfit and moulding elements along the weld as it crystallizes.

For guiding the wire electrodes along the weld axis and providing a continuous current supply to them the outfits for electroslag welding or hardfacing are furnished with current-carrying guides fitted with devices for longitudinal and lateral adjustment of the electrode in the space between the edges of the workpieces being welded and those of the moulding elements. Moreover, the outfits are usually provided with a means for tracing automatically the level of a metal pool and for bringing the rate of travel of the outfits in agreement with the welding speed.

The known procedures of electroslag welding or hardfacing suffer from a number of serious disadvantages.

The above procedures require sophisticated and expensive equipment to be realized.

A very serious disadvantage of the above processes consists in unstable penetration both along the thickness and the length of a welded joint or hardfacing layer. In their cross section the welds have a peculiar barrel-shaped outline with the penetration increasing in a longitudinal section from the beginning of the weld to its end.

Non-uniform penetration is stipulated by the fact that with the known methods of electroslag welding or hardfacing the liberation of heat is practically independent of the penetration. It is promoted by heat extraction, preferably through the workpieces being welded or hardfaced and moulding plates, also dependent on the penetration only to a negligible degree.

At the same time when the penetration changes, the fraction of the parent and electrode metal in a welded joint or a hardfacing layer also changes which results in their chemical heterogenuity.

It is extremely difficult to prevent non-uniform penetration by varying electrical parameters of the process. Moreover, at this time no reliable pickups are available for checking the penetration. That is why with the known procedures the electroslag welding or hardfacing process is practically uncontrollable from the point of view of stabilization of the penetration.

SUMMARY OF THE INVENTION

It is an object of this invention to provide a method of electroslag welding or hardfacing which would make it possible to obtain a stable penetration over the entire surface being welded or hardfaced, to ensure a homogeneous chemical composition of a weld or hardfacing layer and to simplify substantially the equipment for effectiing the above method.

According to said and other objects in a method of electroslag welding or hardfacing effected by passing an electric current between an electrode and workpieces being welded or hardfaced (processed) through a molten slag pool by making of a consumable electrode which is mounted stationary with spaces between moulds and the workpieces being welded or hardfaced, according to the invention, use is made of an electrode having a constant (along its length) cross-sectional area equal to that of deposited metal at a normal temperature with the spaces between the electrode, moulds and the workpieces being welded or hardfaced amounting to the thermal expansion of the electrode when heated to its melting point.

Through the use of the electrode of a constant, along its length, cross-sectional area equal to that of deposited metal at a normal temperature, an equality of linear (vertically) rates of melting of the electrode and of the welding rate may be provided at each given moment. In this case the process of electroslag welding or hardfacing can be effected by using only a stationary electrode by virtue of which the welding equipment employed can be appreciably simplified, insofar as there is no need any longer for mechanisms adapted to feed the electrode, transfer the machine vertically, weave or oscillate the electrode, trace automatically the level of a metal pool and bring in agreement the rate of travel of the welding machine and welding speed.

The herein-proposed method can be effected with the aid of a power source, connecting current-carrying wires and stationary moulds.

According to the invention, the spaces between the electrode, moulds and the workpieces being welded or hardfaced must be equal to the thermal expansion of the electrode when heated to its melting point. Since the spaces are small, the nature of current distribution in the slag pool will change as compared with the known methods. The current will pass preferably between the electrode face and the surface of the parent metal to be welded or hardfaced along the shortest path. At the points of flashing of the electrode and parent metal the resistance to the passage of the current augments abruptly with the current flowing essentially along the sections where flashing has not yet occurred. Owing to this the penetration is stabilized automatically over the entire surface of a weld without any interference from the outside.

As the electrode and the workpiece being welded or hardfaced are heated up, the penetration remains constant and the welding or hardfacing rate will increase. The process is carried out without considerabble overheating of liquid metal, insofar as when the electrode and parent metal are fused, the molten metal flows off immediately downward and the slag pool is simultaneously carried upwards. Stabilization of the penetration ensures a homogeneous chemical composition of the weld and or hardfacing layer.

In electroslag welding or hardfacing positive moulding of the weld or hardfacing layer is employed with detachable parts, such as copper water-cooled plates, being used as moulding elements. In this case a slag skin is formed from the slag of the slag pool on the surface of the weld or hardfacing layer and the depth of the slag pool is reduced which results in a change in electrical parameters (conditions) of the process.

In accordance with this invention, for maintaining a constant depth of the slag pool a slag coating is applied, prior to introducing the electrode into the spaces, to a lateral face of the electrode portion, being melted. The coating is deposited uniformly along the length of the electrode in a volume being melted being equal to that of the slag skin formed after welding or hardfacing.

The coating applied is not electroconductive in a solid state, isolating thereby the electrode from the moulds and the workpieces being welded or hardfaced. As the electrode melts off, the coating melts also in the slag pool offsetting the slag consumed for the formation of the slag skin.

According to one of the embodiments of the proposed method, the coating is applied to the electrode in the form of a uniform dense layer. In this case the spaces between the surface of the electrode coating, moulds and the workpieces being welded or hardfaced should be equal to the thermal expansion of the coated electrode when heated to its melting point. The spaces can be provided along the perimeter of the electrode section either on one, two or three sides.

In accordance with another alternative embodiment of the method an electrode coating is applied in the form of a porous layer so that the volume of its dense portion being melted is equal to that of the slag skin and the volume of its pores is equal to that of the thermal expansion of the coated electrode when heated to its melting point. It can be also applied in the form of separate dense sections whose total volume being melted is equal to that of the slag skin with the volume of intervals between these sections being equal to that of the thermal expansion of the coated electrode when heated to its melting point. Sheet insulating or porous material (such as glass cloth) can be also employed as the coating with the volume of its dense portion being melted being equal to that of the slag skin and the volume of its pores being equal to that of the thermal expansion of the coated electrode when heated to its melting point. On these occasions the coated electrode is tightly mounted between the moulds and the workpieces being welded or hardfaced, which enables the workpieces to be easily and rapidly assembled for welding or hardfacing use.

Thus, the herein-proposed method of electroslag welding or hardfacing ensures stable penetration over the entire surface being welded or hardfaced, and a homogeneous chemical composition of the weld or hardfacing layer allowing the equipment required for effecting the method and the assembling and welding techniques to be appreciably simplified.

BRIEF DESCRIPTION OF THE DRAWINGS

The present invention will be better understood from a consideration of a detailed description of an exemplary embodiment thereof, taken in conjunction with the accompanying drawings, wherein.

DETAILED DESCRIPTION OF PREFERRED EMBODIMENTS

Figure 1:
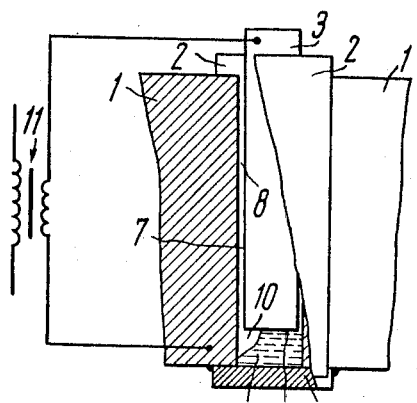
FIG. 1 shows diagrammatically the position of the electrode in electroslag welding, according to the invention, a fragmentary cutaway view.

A herein-proposed method of electroslag welding consists in that a consumable electrode 3 is mounted vertically in a space confined by the edges of workpieces 1 (FIGS. 1 and 2) being welded and moulds 2. In case of electroslag hardfacing the space wherein the electrode 3 (FIG. 3) is mounted is limited by a workpiece 4 and moulds 5.

Figure 2:
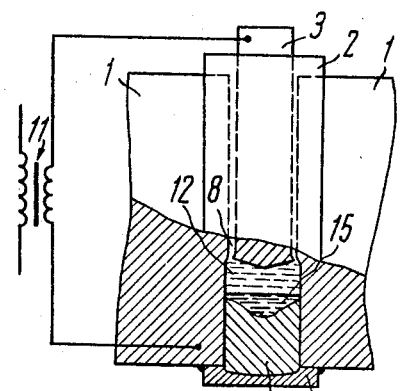
FIG. 2 is a top view of FIG. 1.
Figure 3:
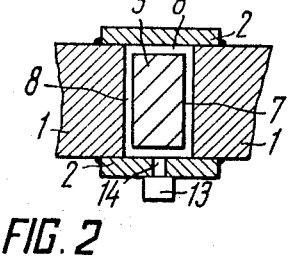
FIG. 3 depicts diagrammatically the position of the electrode in electroslag hardfacing, according to the invention, a fragmentary cutaway view.

In hardfacing and welding said space is limited from below by a mould 6 (FIGS. 1 and 3).

In welding or hardfacing the consumable electrode 3 is installed stationary. In this case the electrode 3 has a constant, along its length, cross-sectional area equal to that of deposited metal at a normal temperature and corresponds in shape to that of deposited metal at a normal temperature. The electrode 3 is then mounted so that spaces 8 are formed between its lateral face 7, the moulds 2 or 5 and workpieces 1 being welded or workpiece 4 being hardfaced, and a cavity 10 is formed between the bottom end 9 of the electrode 3 and the mould 6. The spaces 8 are equal to the thermal expansion of the electrode 3 when heated to its melted point. The electrode 3 and workpieces 1 being welded or workpiece 4 being hardfaced are connected to different terminals of a power source 11, and a slag pool 12 is established in the cavity by pouring molten slag through a bottom gate along a funnel 13 (FIG. 2) and a channel 14 provided in one of the moulds 2 or 5 (FIG. 3), or by any other known method.

Figure 4:
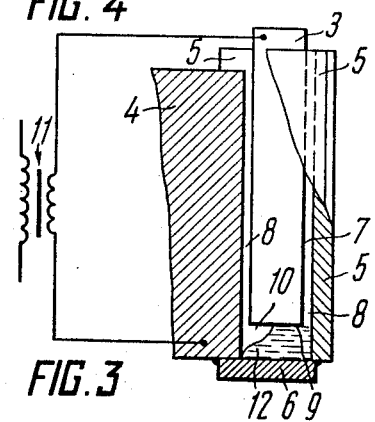
FIG. 4 is a view similar to FIG. 1, in the course of welding.

An electric current passing between the electrode 3 and workpieces 1 (FIG. 4) being welded or workpiece 4 being hardfaced (FIG. 5) heats the molten slag, maintaining it at a high temperature exceeding the melting point of both the workpieces 1 and 4 and the electrode 3. On account of the heat liberated in the slag pool 12 the electrode 3 and the edges of the workpices 1 being welded or workpiece 4 being hardfaced melt. The molten metal runs off downward to form a metal pool 15 and to transfer simultaneously the molten slag in the pool 12 upwards. The liquid metal on solidifying gradually forms a weld 16 (FIG. 4) of a hardfacing layer 17 (FIG. 5).

Through the use of the electrode 3 with a constant (along its length) cross-sectional area equal to that of deposited metal at a normal temperature, the equality of linear (vertically) speeds of melting of the electrode 3 and the welding speed is ensured at any given moment. The hereinproposed method of electroslag welding or hardfacing can be therefore effected by using only a fixed electrode, a feature which allows simplifying appreciably the welding equipment employed.

As the spaces 8 are negligible, being equal to the thermal expansion of the electrode 3 when heated to its melting point, the electric current flows in the slag pool 12 preferably between the bottom end 9 of the electrode 3 and the edges of the workpieces 1 being welded or workpiece 4 being hardfaced along the shortest path. At the points of flashing of the bottom end 9 of the electrode 3 and the edges of the workpieces 1 being welded or workpiece 4 being hardfaced the resistance to the passage of electric current will increase sharply, with the current passing mainly along the sections which have not yet been fused. This provides an automatic stabilization of penetration over the entire surface of the joint.

Figure 5:
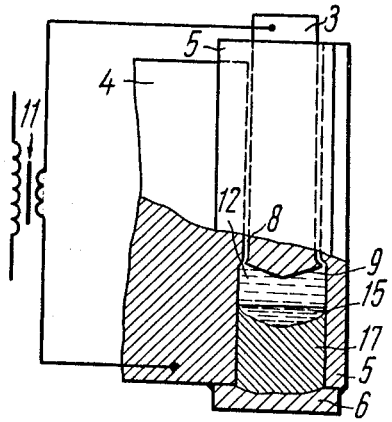
FIG. 5 is a view similar to FIG. 3, in the course of hardfacing.

Stabilization of the penetration ensures a homogeneous chemical composition of the weld 16 (FIG. 4) or of the metal of the hardfacing layer 17 (FIG. 5).

In this case of electroslag welding or hardfacing is executed by using welded-up permanent back-up plates (FIGS. 1 through 5) which serve as moulds 2 and 5, a slag skin is not formed on the side surface of the weld 16 or the hardfacing layer 17 and the depth of the slag pool 12 as well as electrical parameters of the welding or hardfacing process remain constant.

Figure 9:
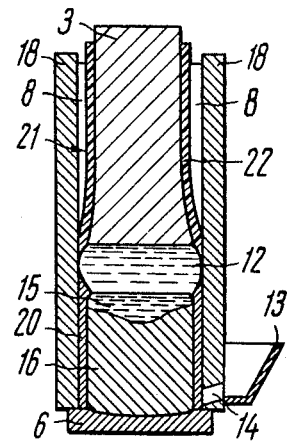
FIG. 9 is a layout of the welding or hardfacing process, a side view, longitudinal section.
Figure 7:
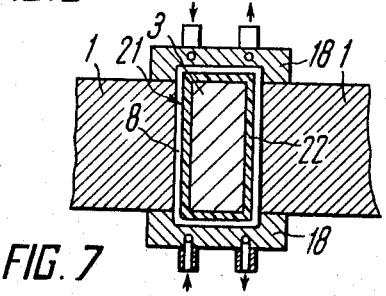
FIG. 7 is a top view of FIG. 6.
Figure 8:
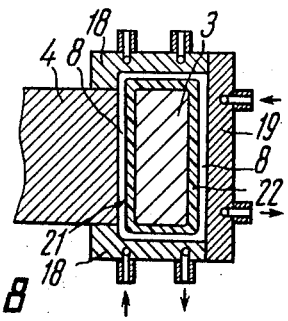
FIG. 8 shows diagrammatically the position of the electrode with a coating applied to its surface during hardfacing, a top view.

In case electroslag welding or hardfacing is carried out with the weld moulded positively with the help of copper water-cooled parts 18 and 19 (FIGS. 6 through 12), a slag skin 20 is formed in the course of welding or hardfacing on the surface of the weld 16 (FIG. 9) or the hardfacing layer 17 at the point of contact between the electrode 3 and the parts 18 and 19. In this case the depth of the slag pool 12 will decrease owing to which the electrical parameters of the process will alter and the uniformity of penetration will be disturbed. In order to maintain a constant depth of the slag pool 12, slag must be added to it, the spaces 8 being not always suitable for that purpose. Therefore, in order to maintain constant electrical parameters and penetration in the course of welding or hardfacing prior to mounting the electrode 3 between the moulds and the workpieces being welded or hardfaced, the lateral face of the electrode 3 is covered with a slag coating 21 whose being melted volume is equal to that of the slag skin 20 being formed. When in a solid state the coating 21 acts as an insulation diminishing the probability of a disruptive discharge between the electrode 3, the moulds and the workpieces being welded or hardfaced. As the electrode 3 melts off, the coating 21 fuses gradually to make up for the slag consumed partially from the slag pool 12 for the formation of the slag skin 20.

The coating 21 is applied to the lateral face 7 of the part of the electrode 3 being melted in the form of a uniform dense layer 22 (FIGS. 6 through 9). In this case the electrode 3 with the coating 21 applied to it is mounted between the workpieces 1 being welded or workiece 4 being hardfaced and moulding parts 18 and 19 with the spaces 8 amounting to the thermal expansion of the coated electrode when heated to its melting point.

Figure 13A:
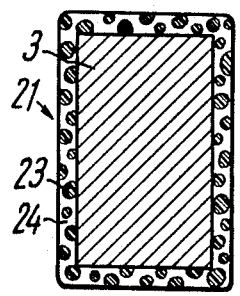
FIG. 13a, b, c — alternative embodiments of the coating applied to the electrode according to the invention, a top cross-sectional view.
Figure 13B:
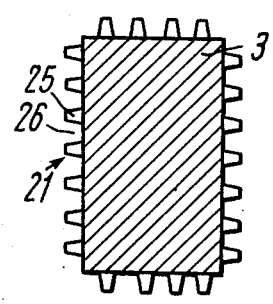
Figure 13C:
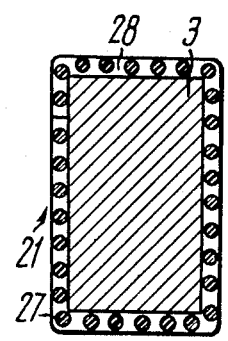

FIGS. 13a through 13c depict other embodiments of the coating 21 applied to the lateral face of the electrode 3 for effecting the invention.

Figure 10:
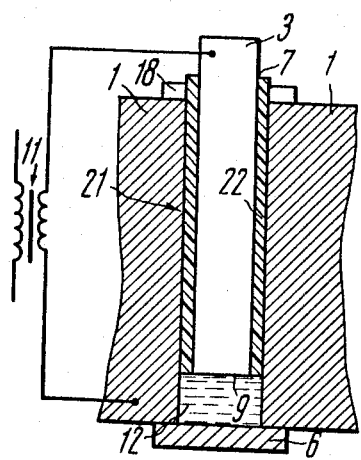
FIG. 10 illustrates the position of the electrode with a coating applied to it in the form of a porous layer between the workpieces being welded and the moulds.
Figure 11:
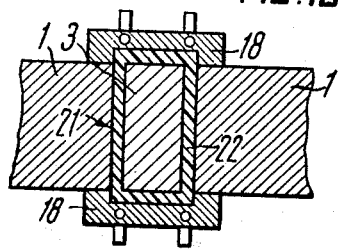
FIG. 11 is a top view of FIG. 10.
Figure 12:
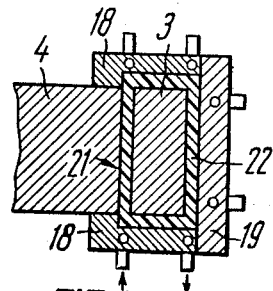
FIG. 12 shows diagrammatically the position of the electrode with a coating in the form of a porous layer between the workpiece being hardfaced and the moulds, a top view.
Figure 6:
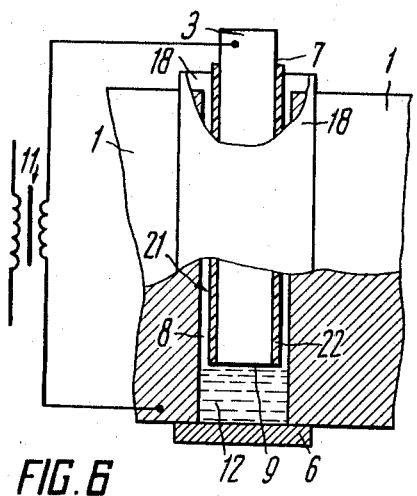
FIG. 6 shows diagrammatically the position of the electrode with a dense coating applied to its surface between the workpieces being welded and the moulds, according to the invention, a fragmentary cutaway view.

According to one of these embodiments the coating 21 is applied to the lateral face of the electrode 3 in the form of a porous layer. The volume of its dense portion 23 (FIG. 13a) being melted is equal to that of the slag skin 20 (FIG. 9) formed after welding or hardfacing, and the volume of pores 24 (FIG. 13a) is equal to that of the thermal expansion of the coated electrode when heated to its melting point. In this case the electrode 3 with the coating 21 applied to it in the form of the porous layer is tightly arranged between the moulding parts 18 and 19 and the workpieces 1 being welded or workpiece 4 being hardfaced (FIGS. 10 through 12). The pores comprise the spaces between the coated electrode and the moulding parts and the workpieces.

Alternatiely the coating 21 (FIG. 13b) may be applied to the lateral face 7 of the part of the electrode 3 being melted in the form of separate dense sections 25. The total volume of the sections being melted is equal to that of the slag skin 20 (FIG. 9) and the volume of intervals 26 (FIG. 13b) is equal to that of the thermal expansion of the coated electrode when heated to its melting point. The coated electrode, just as the electrode with a porous coating, is tightly mounted between the workpieces (FIGS. 10 through 12). The intervals comprise the spaces between the coated electrode and the moulding parts and the workpieces.

According to the third alternative embodiment, a sheet of insulating porous material, such as glass cloth, is used as the coating 21 (FIG. 13c). The volume of its dense part 27 being melted is equal to that of the slag skin 20 and the volume of its pores 28 is equal to that of the thermal expansion of the coated electrode when heated to its melting point. The electrode 3 with the above coating, just as with a coating in the form of a porous layer, is tightly mounted between the moulding parts and the workpieces being welded (FIGS. 10 through 12). The pores comprise the spaces between the coated electrode and the moulding parts and the workpieces.

The coating 21 is applied to the electrode by any known procedure (sheathing under pressure, dipping, spraying, etc.) and the sheet metal is glued to the surface of the electrode 3 with liquid glass.

What we claim is:

1. A method of electroslag welding or hardfacing of workpieces comprising: mounting a stationary electrode having its length a constant cross-sectional area equal to that of deposited metal at a normal temperature between moulding parts and workpieces being processed so that spaces being equal to the thermal expansion of the electrode when heated to its melting point are formed between said moulding parts, workpieces and electrode, and a free cavity is formed between the bottom end of the electrode and moulding parts encompassing said electrode and the workpieces; connecting said electrode and the workpieces to different terminals of a power source; filling said cavity with molten slag; and passing an electric current between the electrode and workpieces to heat the molten slag and to melt the bottom end of the electrode and the edges of the workpieces.

2. The method of claim 1, further comprising applying a slag coating to the electrode uniformly along its length before mounting it between the moulding parts and workpieces being processed, the volume of the coating being melted being equal to that of a slag skin being formed during welding or hardfacing.

3. The method of claim 2 wherein the coating is applied to the electrode in the form of a uniform dense layer.

4. The method of claim 2 wherein the coating is applied to the electrode in the form of a porous layer with the volume of its dense portion being melted being equal to that of the slag skin and the volume of its pores being equal to the volume of the thermal expansion of the coated electrode when heated to its melting point; and the pores of the porous layer comprise the spaces between the coated electrode and the moulding parts and the workpieces being processed.

5. The method of claim 2 wherein the coating is applied to the electrode in the form of separate dense sections with intervals, the total volume of said dense sections being melted being equal to that of the slag skin, the volume of said intervals between the sections being equal to that of the thermal expansion of the coated electrode when heated to its melting point: and the intervals comprise the spaces between the coated electrode and the moulding parts and the workpieces being processed.

6. The method of claim 2 wherein a sheet of porous insulating material comprises the coating with the volume of its dense portion being melted being equal to that of the slag skin and the volume of its pores being equal to that of the thermal expansion of the coated electrode when heated to its melting point; and the pores comprise the spaces between the coated electrode and the moulding parts and the workpieces being processed.

* * * * *